(12) United States Patent
Higuchi

(10) Patent No.: US 7,276,834 B2
(45) Date of Patent: Oct. 2, 2007

(54) ELECTROSTATICALLY OSCILLATED DEVICE

(75) Inventor: Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/489,682

(22) Filed: Jul. 20, 2006

(65) Prior Publication Data

US 2006/0255694 A1 Nov. 16, 2006

Related U.S. Application Data

(62) Division of application No. 11/075,708, filed on Mar. 10, 2005, now Pat. No. 7,159,462.

(30) Foreign Application Priority Data

Mar. 12, 2004 (JP) ............................... 2004-70062
Mar. 12, 2004 (JP) ............................... 2004-70063

(51) Int. Cl.
*H02N 1/00* (2006.01)
*G01P 15/125* (2006.01)
*G01P 15/00* (2006.01)
*G01P 3/44* (2006.01)

(52) U.S. Cl. ................ 310/309; 73/514.16; 73/504.14; 73/514.32

(58) Field of Classification Search .................. 73/488, 73/504.2, 504.4, 504.12, 514.16, 514.29; 310/308, 309; 361/127
See application file for complete search history.

(56) References Cited

U.S. PATENT DOCUMENTS

| | | | | |
|---|---|---|---|---|
| 5,908,986 | A | 6/1999 | Mitamura | 73/504.12 |
| 6,450,033 | B1 | 9/2002 | Ito et al. | 73/514.29 |
| 6,470,748 | B1 | 10/2002 | Geen | 73/504.12 |
| 2002/0073780 | A1* | 6/2002 | Katsumata et al. | 73/514.32 |

FOREIGN PATENT DOCUMENTS

| | | |
|---|---|---|
| JP | A-H05-231870 | 9/1993 |
| JP | A-H08-178665 | 7/1996 |
| JP | A-2002-323323 | 11/2002 |

* cited by examiner

*Primary Examiner*—Hezron Williams
*Assistant Examiner*—Tamiko Bellamy
(74) *Attorney, Agent, or Firm*—Posz Law Group, PLC

(57) ABSTRACT

An oscillator is oscillatable in a predetermined direction. First and second driving electrodes are secured to the base and apply an electrostatic force to the oscillator to make drive oscillation of the oscillator in the predetermined direction. At the time of the drive oscillation of the oscillator, a predetermined electric charge is accumulated in the oscillator, and electric charges of opposite polarities are alternately and periodically accumulated in the first and second driving electrodes, respectively, to exert an attractive force between the oscillator and a corresponding one of the first and second driving electrodes and also to exert a repulsive force between the oscillator and the other one of the first and second driving electrodes, and vice versa.

3 Claims, 9 Drawing Sheets

ELECTROSTATICALLY OSCILLATED DEVICE

CROSS REFERENCE TO RELATED APPLICATION

This application is a division of application Ser. No. 11/075,708 filed on Mar. 10, 2005 now U.S. Pat. No. 7,159,462, and is based on and incorporates herein by reference Japanese Patent Application No. 2004-70062 filed on Mar. 12, 2004 and Japanese Patent Application No. 2004-70063 filed on Mar. 12, 2004.

BACKGROUND OF THE INVENTION

1. Field of the Invention

The present invention relates to an electrostatically oscillated device, such as an electrostatically oscillated angular velocity sensor or an electrostatically oscillated actuator, which has an oscillator that is oscillated by electrostatic forces.

2. Description of Related Art

For instance, an electrostatically oscillated angular velocity sensor, which is fabricated by, for example, etching a semiconductor substrate to form a base, an oscillator and driving electrodes for driving the oscillator, has been proposed as the electrostatically oscillated device (see, for example, Japanese Unexamined Patent Publication No. 2003-511684, which corresponds to U.S. Pat. No. 6,470,748, or Japanese Unexamined Patent Publication No. 2001-91265, which corresponds to U.S. Pat. No. 6,450,033).

In the electrostatically oscillated angular velocity sensor, the oscillator is driven through the driving electrodes to generate drive oscillation in a predetermined direction. In this oscillated state, when an angular velocity is applied, the oscillator is also oscillated in an orthogonal direction, which is orthogonal to the predetermined direction of the drive oscillation, to generate measurement oscillation due to generation of a Coriolis force. Through measurement of this measurement oscillation in the orthogonal direction, the degree of the angular velocity is determined.

Specifically, in the electrostatically oscillated angular velocity sensor, the oscillator is oscillated by the electrostatic forces. More specifically, flat electrodes or toothed electrodes are provided on left and right sides, respectively, of the oscillator. A predetermined voltage is applied to the oscillator, and two voltages, which are of opposite phases, are applied to the left and right driving electrodes, so that the oscillator is oscillated.

However, in the previously proposed electrostatically oscillated angular velocity sensor, there is only a little drive force, which corresponds to a difference between an attractive force of the left driving electrode and an attractive force of the right driving electrode. Thus, the efficiency of the sensor is not high. This point will be more specifically described with reference to FIG. 10.

FIG. 10 is a schematic plan view showing a structure of one previously proposed electrostatically oscillated angular velocity sensor, i.e., one previously proposed electrostatically oscillated device.

In the manufacturing of such an angular velocity sensor, a silicon-on-insulator (SOI) board, which includes two silicon plates that are joined through an oxide film, is processed using known semiconductor processing technology.

An oscillator 30 is secured to a base 20 through driving bridges 33. The driving bridges 33 are resiliently deformable in an x-direction in FIG. 10. Toothed driving electrodes 40, 41 are secured to the base 20. The driving electrodes 40, 41 apply electrostatic forces to the oscillator 30 to drive the oscillator 30 and thereby to generate the drive oscillation of the oscillator 30 in the x-direction. The driving electrodes 40, 41 include first and second driving electrodes 40, 41. In FIG. 10, the first and second driving electrodes 40, 41 are provided on the left and right sides, respectively, of the oscillator 30 to oppose each other in the x-direction.

Furthermore, in FIG. 10, a sensing mass 32 is arranged in the center of the oscillator 30. The sensing mass 32 is connected to the rest of the oscillator 30 by sensing bridges 34, which are resiliently deformable in a y-direction. Two sensing electrodes 50 are secured to the base 20 at two locations, respectively, which are opposed to the sensing mass 32.

In the electrostatically oscillated angular velocity sensor shown in FIG. 10, a predetermined voltage is applied to the oscillator 30, and two alternating voltages (drive signals), which are of opposite phases, are applied to the left and right driving electrodes 40, 41, respectively. As a result, the oscillator 30 is driven through the driving bridges 33 to generate the drive oscillation of the oscillator 30 in the x-direction.

Specifically, the predetermined voltage V0 is applied from a direct current (DC) power source 110 to the oscillator 30. Through use of an alternating current (AC) power source 100 and an inverter 120, the alternating voltage V1 is applied to the first driving electrode 40, and the alternating voltage V1', which has the phase that is opposite to the phase of the alternating voltage V1, is applied to the second driving electrode 41.

Thus, the electrostatic attractive force F1 is exerted between the first driving electrode 40 and the oscillator 30, and the electrostatic attractive force F2 is exerted between the second driving electrode 41 and the oscillator 30. The electrostatic force F1, which is exerted between the first driving electrode 40 and the oscillator 30, is expressed by $F1 \propto |V0-V1|$. Similarly, the electrostatic force F2, which is exerted between the second driving electrode 41 and the oscillator 30, is expressed by $F2 \propto |V0-V2|$.

A difference (F1−F2) between the electrostatic attractive force F1 and the electrostatic attractive force F2 is used as a drive force for generating the drive oscillation of the oscillator 30 in the x-direction.

In the above state where the oscillator 30 is driven to generate the drive oscillation, when an angular velocity Ω is applied around a z-axis in FIG. 10, the Coriolis force is generated in the oscillator 30 in the y-direction. Thus, the sensing mass 32 of the oscillator 30, which is supported by the sensing bridges 34, is oscillated in the y-direction by the Coriolis force to produce measurement oscillation.

The capacitance between each sensing electrode 50 and the sensing mass 32 changes due to the measurement oscillation. The change in the capacitance is measured through the corresponding C/V converter 130 to determine the degree of the angular velocity Ω.

When the oscillator 30 is driven in the above described manner to generate the drive oscillation, the angular velocity Ω can be measured. However, as described above, only the small difference (F1−F2) between the electrostatic attractive forces F1, F2 is used to drive the oscillator 30. Thus, the efficiency of the drive oscillation is not high.

The above disadvantage is not specific to the electrostatically oscillated angular velocity sensor but is commonly encountered when the efficiency of the drive oscillation, i.e., the amplitude of the drive oscillation needs to be increased in the electrostatically oscillated devices, which has the above oscillator and driving electrodes.

Furthermore, the Coriolis force is proportional to the oscillating speed of the drive oscillation of the oscillator 30. Thus, the oscillating speed of the drive oscillation of the oscillator 30 needs to be increased to increase the sensitivity of the angular velocity and thereby to accurately sense the angular velocity. To achieve this goal, the number of the electrode teeth of each driving electrode needs to be increased to increase the drive force, i.e., the electrostatic force. For example, in the case of the sensor shown in FIG. 10, the number of the electrode teeth of each driving electrode 40, 41 should be increased.

However, when the number of the electrode teeth of each driving electrode is simply increased, the size of the board of the sensor is disadvantageously increased. To address this disadvantage, the inventor of the present invention has made a prototype electrostatically oscillated angular velocity sensor.

The prototype sensor of FIG. 11 is produced by forming two frames 131 in the left and right parts, respectively, of the oscillator 30 of the prototype sensor of FIG. 10.

In FIG. 11, a portion of each driving electrode 140, 141, which is secured to a base 320, is placed inside the corresponding frame 131 to form a frame interior side securing portion 160. A toothed driving electrode portion 140*b*, 141*b* is provided to each frame interior side securing portion 160, which is surrounded by the corresponding frame 131.

That is, each driving electrode 140, 141 of the second prototype sensor has the toothed first driving electrode part 140*a*, 141*a* and the toothed second driving electrode part 140*b*, 141*b*. The first driving electrode part 140*a*, 141*a* is opposed to the corresponding outer side of the oscillator 330, and the second driving electrode part 140*b*, 141*b* is provided to the corresponding frame interior side securing portion 160 and is opposed to the inner side of the corresponding frame 131.

When the oscillator 330 is formed to have the frames 131, and the toothed driving electrode part 140*b*, 141*b* is additionally provided inside each frame 131, it is possible to increase the number of the electrode teeth to increase the total effective electrode surface area, which aids in the drive oscillation of the oscillator 330. Due to the increase of the number of the electrode teeth, which is made possible by the additional second driving electrode parts 140*b*, 141*b*, the electrostatic force, which is applied to the oscillator 330, should be increased.

However, in the case of the structure shown in FIG. 11, an opposite electrostatic force, which is exerted in a direction opposite from the driving electrostatic force used in generation of the drive oscillation of the oscillator 330, is exerted in each space (hereinafter, referred to as a back surface side space) 170. The back surface side space 170 is defined between a back surface 160*a* of each frame interior side securing portion 160, which is opposite from the teeth of the corresponding second driving electrode part 140*b*, 141*b* of the frame interior side securing portion 160, and the inner side of the frame 131, which is opposed to the back surface 160*a*.

Thus, although the number of the electrode teeth is increased, the drive force is not increased in proportional to the number of the electrode teeth, so that the oscillating speed of the drive oscillation of the oscillator 330 is not proportionally increased. The above disadvantage is not specific to the electrostatically oscillated angular velocity sensor but is commonly encountered when the drive force needs to be increased in the electrostatically oscillated devices having the oscillator that includes the frame, which surrounds the toothed electrode portion.

SUMMARY OF THE INVENTION

The present invention addresses the above disadvantages. Thus, it is an objective of the present invention to provide an electrostatically oscillated device, which has an oscillator and driving electrodes and achieves an increased amplitude of oscillation of the oscillator. It is another objective of the present invention to provide an electrostatically oscillated device, which includes a base, an oscillator and driving electrodes and which provides an appropriately increased drive force for oscillating the oscillator while minimizing an increase in a size of the electrostatically oscillated device.

To address the above objectives of the present invention, there is provided an electrostatically oscillated device, which includes a base, an oscillator and first and second driving electrodes. The oscillator is movable relative to the base. Also, the oscillator is oscillatable in a predetermined direction. The first and second driving electrodes are secured to the base and apply an electrostatic force to the oscillator to make drive oscillation of the oscillator in the predetermined direction. The first and second driving electrodes are arranged on first and second sides, respectively, of the oscillator, which are opposed to each other in the predetermined direction. At the time of the drive oscillation of the oscillator, a predetermined electric charge is accumulated in the oscillator, and electric charges of opposite polarities are alternately and periodically accumulated in the first and second driving electrodes, respectively, to exert an attractive force between the oscillator and a corresponding one of the first and second driving electrodes and also to exert a repulsive force between the oscillator and the other one of the first and second driving electrodes.

To achieve the objectives of the present invention, there is also provided an electrostatically oscillated device, which includes a base, an oscillator, first and second driving electrodes, at least one first driving electrode side dummy portion and at least one second driving electrode side dummy portion. The oscillator is movable relative to the base. Also, the oscillator is oscillatable in a predetermined direction and includes first and second frames, which are arranged one after another in the predetermined direction. First and second driving electrodes are secured to the base and apply an electrostatic force to the oscillator to make drive oscillation of the oscillator in the predetermined direction. The first and second driving electrodes are arranged on first and second sides, respectively, of the oscillator, which are opposed to each other in the predetermined direction. The first driving electrode includes a primary driving electrode portion, a frame interior side securing portion and a secondary driving electrode portion. The primary driving electrode portion is opposed to a first side outer peripheral portion of the oscillator in the predetermined direction. The frame interior side securing portion is secured to the base and extends from the primary driving electrode portion of the first driving electrode into the first frame. The secondary driving electrode portion is provided to the frame interior side securing portion of the first driving electrode to oppose an inner peripheral portion of the first frame in the predetermined direction. The second driving electrode includes a primary driving electrode portion, a frame interior side securing portion and a secondary driving electrode portion. The primary driving electrode portion is opposed to a second side outer peripheral portion of the oscillator in the predetermined direction. The frame interior side securing portion of the second driving electrode is secured to the base and extends from the primary driving electrode portion of the second driving electrode into the second frame. The secondary driving electrode portion is provided to the frame interior side securing portion of the second driving electrode to oppose an inner peripheral portion of the second frame in the predetermined direction. The at least one first driving electrode side dummy portion is positioned inside the first frame between the first side outer peripheral portion of the oscillator and the secondary driving electrode portion of the first driving electrode in the predetermined direction and has an electric potential that is in a floating state or is the same as that of the first frame. The at least one second driving electrode side dummy portion is positioned inside the second frame between the second side outer peripheral portion of the oscillator and the secondary driving electrode portion of the second driving electrode in the predetermined direction and has an electric potential that is in a floating state or is the same as that of the second frame.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
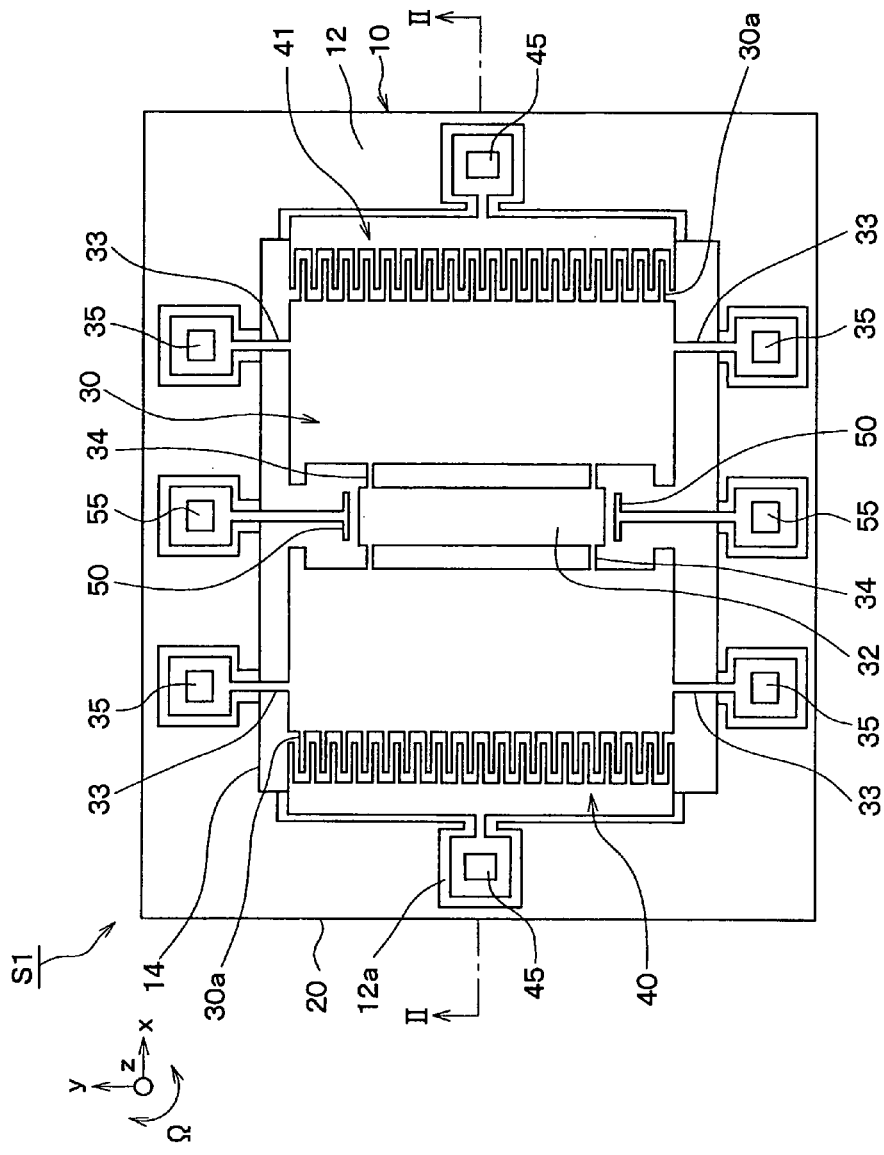
FIG. 1 is a schematic plan view of an electrostatically oscillated angular velocity sensor, which serves as an electrostatically oscillated device, according to a first embodiment of the present invention.
Figure 2:
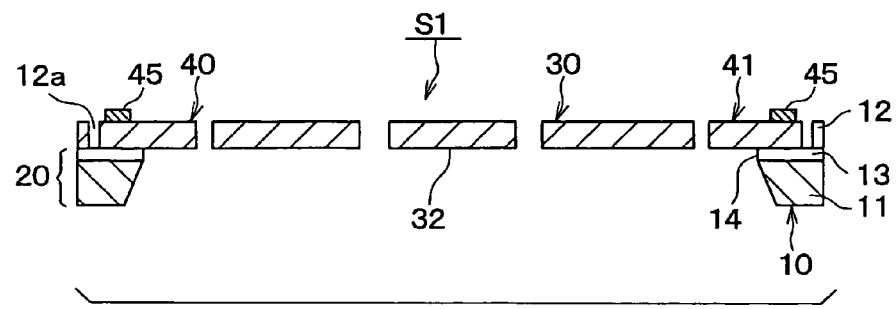
FIG. 2 is a cross sectional view taken along line II-II in FIG. 1.

A first embodiment of the present invention will be described with reference to FIGS. 1 to 5. FIG. 1 is a plan view of an electrostatically oscillated angular velocity sensor S1, which serves as an electrostatically oscillated device, according to the first embodiment of the present invention. FIG. 2 is a cross sectional view taken along line II-II in FIG. 1.

With reference to FIG. 2, a board of the angular velocity sensor S1 is a silicon-on-insulator (SOI) board 10, which includes first and second silicon plates 11, 12 and an oxide film 13 interposed therebetween.

Trenches 12a are formed in the second silicon plate 12 to define an oscillator 30, driving electrodes 40, 41, sensing electrodes 50 and bridges 33, 34 in an etching process.

Furthermore, the first silicon plate 11 and the oxide film 13 are eliminated by etching in a portion of the SOI board 10, which corresponds to the oscillator 30, so that an opening 14 is formed. An outer peripheral portion of the first silicon plate 11 and of the oxide film 13 around the opening 14 is formed as a support arrangement, i.e., a base 20.

The oscillator 30, which is arranged above the opening 14, is secured to the base 20 through the driving bridges 33. In the present embodiment, the oscillator 30 is connected to the base 20 through the four driving bridges 33.

Furthermore, with reference to FIG. 1, a sensing mass 32 is provided in the center of the oscillator 30 and is connected to its adjacent parts of the oscillator 30 through the sensing bridges 34. In the present embodiment, the sensing mass 32 is connected to the adjacent parts of the oscillator 30 through the four sensing bridges 34.

Here, with reference to FIG. 1, the driving bridges 33 are relatively freely deflectable in an x-direction and are limited from deflection in a y-direction. Thus, the driving bridges 33 allow oscillation of the oscillator 30 in the x-direction. In contrast, the sensing bridges 34 are relatively freely deflectable in the y-direction and are limited from deflection in the x-direction. Thus, the sensing bridges 34 allows oscillation of the oscillator 30 in the y-direction.

Furthermore, in the second silicon plate 12, which is secured to the base 20, the driving electrodes 40, 41 are formed on the left and right sides of the oscillator 30 to oppose each other in the x-direction. The driving electrodes 40, 41 are provided to apply electrostatic forces to the oscillator 30 to generate the drive oscillation of the oscillator 30 in the x-direction.

The driving electrodes 40, 41 include first and second driving electrodes 40, 41. The first and second driving electrodes 40, 41 are provided on the left and right sides, respectively, of the oscillator 30 to oppose each other in the x-direction. In the present embodiment, each of the first and second driving electrodes 40, 41 is formed as a toothed driving electrode that has a plurality of teeth (i.e., a driving electrode portion having the teeth). The teeth of each of the first and second driving electrodes 40, 41 and teeth of a corresponding opposed tooth arrangement 30a of the oscillator 30 are alternately arranged in the y-direction.

The two sensing electrodes 50 are secured to the base 20 at two locations, respectively, which are opposed to the sensing mass 32. Specifically, the sensing electrodes 50 are arranged on the opposed sides of the sensing mass 32 of the second silicon plate 12, which are opposed to each other in the y-direction.

The sensing electrodes 50 are provided to sense the oscillation (measurement oscillation) of the sensing mass 32 in the y-direction generated at the time of applying the angular velocity Ω around the z-axis, which is perpendicular to the x-direction and the y-direction, in the presence of the drive oscillation of the oscillator 30. Then, the sensing electrodes 50 output measurement signals, which correspond to the sensed oscillation (the measurement oscillation) of the sensing mass 32.

Here, pads (driving electrode side pads) 45, which are made of, for example, aluminum, are provided to the driving electrodes 40, 41, respectively. Also, pads (sensing electrode side pads) 55, which are made of, for example, aluminum, are provided to the sensing electrodes 50, respectively. Each of the pads 45, 55 is electrically connected to a circuit (FIG. 5) through, for example, wire bonding.

Furthermore, at a securing portion of each driving bridge 33 to the base 20, a pad (oscillator side pad) 35 is formed from, for example, aluminum. Each of the pads 35 is electrically connected to the circuit (FIG. 5) through, for example, wire bonding.

Next, the manufacturing method of the angular velocity sensor S1, which is made of the silicon-on-insulator (SOI), will be described. FIGS. 3A to 4D show the manufacturing method of the angular velocity sensor S1. Specifically, each of FIGS. 3A to 4D shows a cross section of a corresponding workpiece in a corresponding manufacturing step.

Figure 3A:
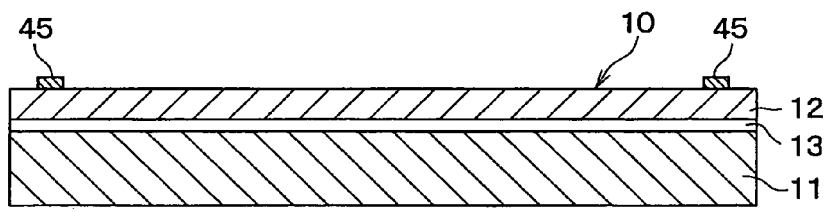
FIGS. 3A to 3C are diagrams, which respectively indicate cross sections similar to that of FIG. 2 and show manufacturing steps of the angular velocity sensor of the first embodiment.

First, as shown in FIG. 3A, the SOI board 10 is prepared. The SOI board 10 includes the first and second silicon plates 11, 12 and the oxide film 13. The first and second silicon plates 11, 12 are made of single crystal silicon. The oxide film 13 has a thickness of, for example, 1 μm and is interposed between the first silicon plate 11 and the second silicon plate 12.

Then, phosphorus or the like is diffused (N+ diffusion) into the entire surface of the second silicon plate 12 at a high density to reduce the contact resistance between the second silicon plate 12 and each corresponding aluminum pad 35, 45, 55 (only the pads 45 are depicted in the drawing).

Next, the respective pads 35, 45, 55 are formed by vapor depositing aluminum of, for example, 1 μm thickness onto the surface (the second silicon plate 12) of the SOI board 10 and then by photo-etching the aluminum.

Figure 3B:
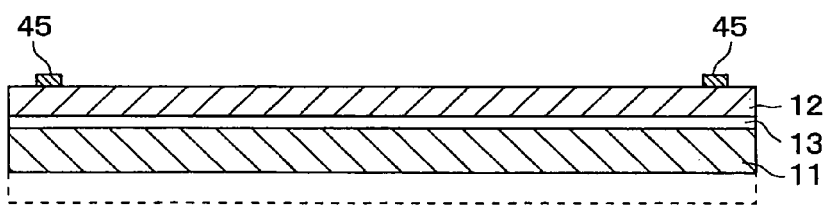

Next, as shown in FIG. 3B, the back surface (the first silicon plate 11) of the SOI board 10 is ground and is polished through back polishing to a predetermined thickness (e.g., 300 μm), so that the back surface (the first silicon plate 11) of the SOI board 10 is mirror finished.

Figure 3C:
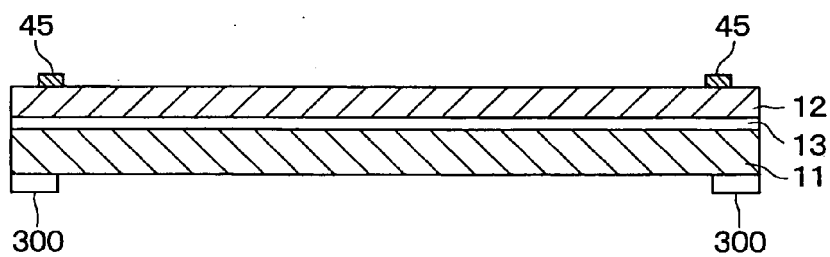

Thereafter, as shown in FIG. 3C, a plasma SiN film 300 of, for example, 0.5 μm, is deposited onto the back surface (the first silicon plate 11) of the SOI board 10 to form a photo pattern. Then, the plasma SiN film 300 is etched to form an opening in a predetermined area of the plasma SiN film 300.

Figure 4A:
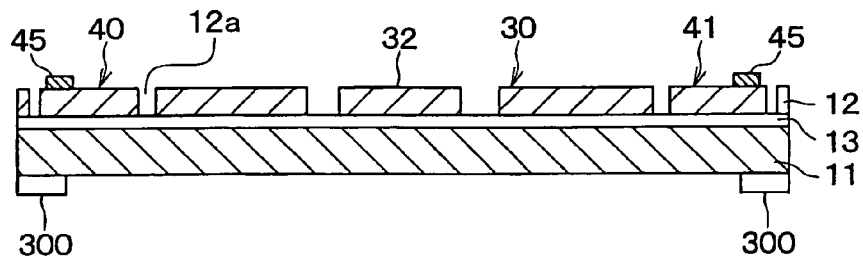
FIGS. 4A to 4D are diagrams, which are similar to FIGS. 3A to 3C and show manufacturing steps that follow the manufacturing steps of FIGS. 3A to 3C.

Next, with reference to FIG. 4A, a pattern, which defines the oscillator 30, the driving electrodes 40, 41, the sensing electrodes 50 and the bridges 33, 34, is formed on the surface of the second silicon plate 12. Then, the trenches 12a, which reach the oxide film 13, are formed vertically by dry etching.

Figure 4B:
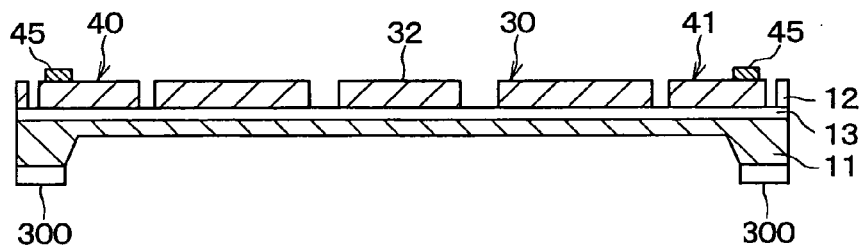

Then, as shown in FIG. 4B, the first silicon plate 11 is deeply etched in KOH solution while the pattern formed in the plasma SiN film 300 is used as a mask.

At this time, when the etching proceeds to the oxide film 13, the oxide film 13 may be destroyed by the fluid pressure of the etching solution. Thus, the etching time should be carefully controlled to end in a manner that leave the silicon of 10 μm in the first silicon plate 11 to limit the destruction of the oxide film 13.

Figure 4C:
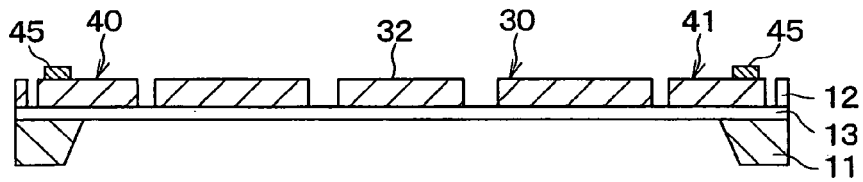

Next, as shown in FIG. 4C, the silicon (Si), which is left in the step of FIG. 4B, is removed by plasma dry etching. At this time, the plasma SiN film 300, which is present on the back surface of the SOI board 10, is simultaneously removed.

Figure 4D:
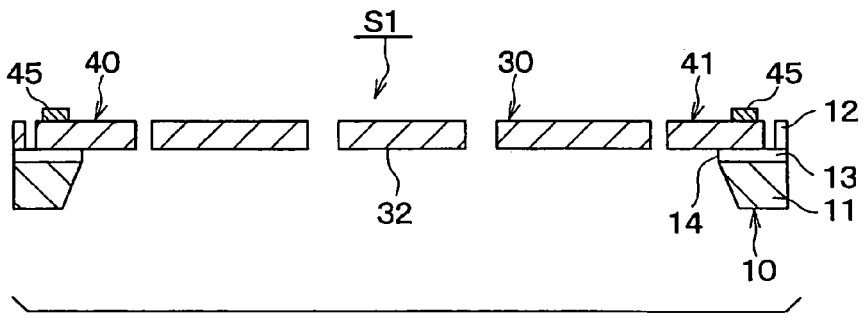

Finally, as shown in FIG. 4D, the oxide film 13 is removed from the corresponding part by dry etching, so that the oscillator 30 is formed. In this way, the manufacturing of the angular velocity sensor S1 is completed. Thereafter, each of the pads 35, 45, 55 is electrically connected to the circuit (FIG. 5) by, for example, wire bonding.

Figure 5:
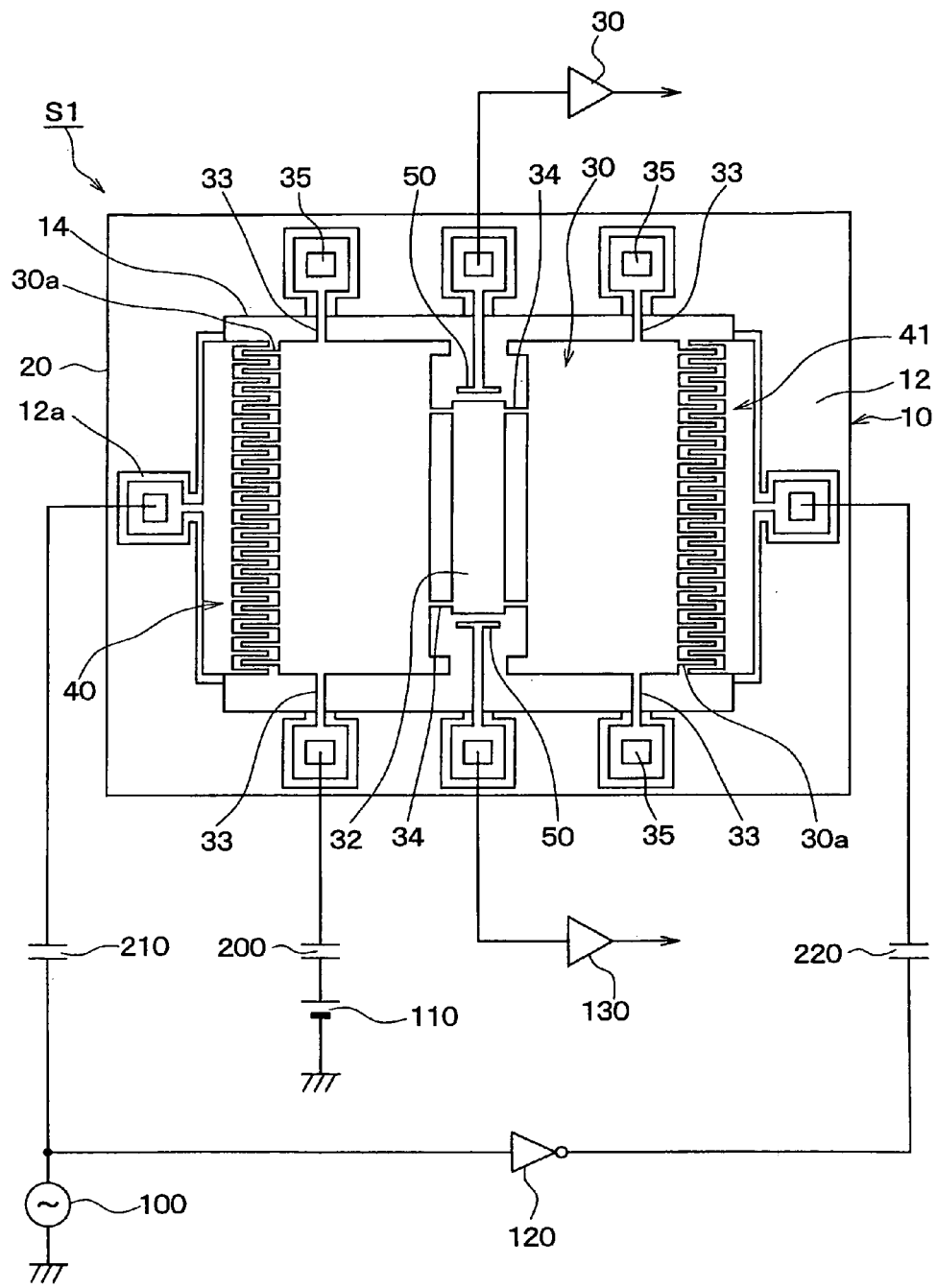
FIG. 5 is a diagram showing a circuit structure of the angular velocity sensors of the first embodiment.

Next, operation of the angular velocity sensor S1 will be described. FIG. 5 shows a circuit structure of the angular velocity sensor S1, which includes the above described circuit.

As shown in FIG. 5, the circuit includes an alternating current (AC) power surface 100, a direct current (DC) power source 110, an inverter 120 and capacitance-to-voltage (C/V) converters 130. The circuit can be an integrated circuit, which is formed integrally on the SOI board 10 having the angular velocity sensor S1. Alternatively, the circuit can be a separate circuit, which is separated from the SOI board 10.

An oscillator side capacitor 200 is connected between the DC power source 110 and the oscillator 30 and is electrically connected to the oscillator 30. The oscillator side capacitor 200 is provided to accumulate electric charge in the oscillator 30.

Furthermore, a first driving electrode side capacitor 210 is connected between the AC power source 100 and the first driving electrode 40. The first driving electrode side capacitor 210 is electrically connected to the first driving electrode 40. The first driving electrode side capacitor 210 is provided to accumulate electric charge in the first driving electrode 40.

Furthermore, a second driving electrode side capacitor 220 is connected between the inverter 120 and the second driving electrode 41. The second driving electrode side capacitor 220 is electrically connected to the second driving electrode 41. The second driving electrode side capacitor 220 is provided to accumulate electric charge in the second driving electrode 41.

The capacitance between the first driving electrode 40 and the oscillator 30 (specifically, the left tooth arrangement 30a of the oscillator 30 in FIG. 5) is set to be equal to the capacitance between the second driving electrode 41 and the oscillator 30 (specifically, the right tooth arrangement 30a of the oscillator 30 in FIG. 5).

Furthermore, the capacitance of the first driving electrode side capacitor 210 is set to be equal to the capacitance of the second driving electrode side capacitor 220. Here, for ease of explanation, the capacitance of the oscillator side capacitor 200 is denoted as C0, and each of the capacitance of the first driving electrode side capacitor 210 and the capacitance of the second driving electrode side capacitor 220 is denoted as C1.

Each of the capacitance C0 of the oscillator side capacitor 200, the capacitance C1 of the first driving electrode side capacitor 210 and the capacitance C1 of the second driving electrode side capacitor 220 is greater than the capacitance between the first driving electrode 40 and the oscillator 30.

For example, it is desirable to set each of the capacitance C0 and the capacitance C1 to be at least ten times greater than the capacitance between the first driving electrode 40 and the oscillator 30 to accumulate sufficient electric charge in each corresponding component.

Each capacitor 200, 210, 220 can be formed integrally as a part of an integral circuit, which is integrated in the SOI board 10. Alternatively, each capacitor 200, 210, 220 can be formed as a part of a separate circuit board, which is formed separately from the SOI board 10. Furthermore, each capacitor 200, 210, 220 can be formed by a semiconductor manufacturing process or can be formed as a parasitic capacitor of the SOI board 10. Also, each capacitor 200, 210, 220 can be formed as an external discrete component, such as an electrolytic capacitor.

In the above circuit structure, a predetermined electric potential V0 is applied from the DC power source 110 to the oscillator 30 when the oscillator 30 is driven to oscillate in the x-direction. An electric charge Q0, which is accumulated in the oscillator side capacitor 200, is expressed as Q0=C0·V0, and a predetermined electric charge (−Q0) is accumulated in the oscillator 30.

In the above state where the predetermined electric charge (−Q0) is accumulated in the oscillator 30, the alternating current, which has the sine waveform, is outputted from the AC power source 100. At this time, the voltage, which has the phase opposite from that of the first driving electrode 40, is applied to the second driving electrode 41.

In an exemplary case where the positive voltage V1 is applied from the AC power source 100 to the first driving electrode side capacitor 210, the electric charge Q1, which is accumulated in the first driving electrode side capacitor 210, is expressed as Q1=C1·V1. The electric charge (+Q1), which has the polarity opposite from that of the oscillator 30, is accumulated in the first driving electrode 40.

At this time, the voltage V1, which has the phase opposite from that of the first driving electrode side capacitor 210, is applied from the inverter 120 to the second driving electrode side capacitor 220. Thus, the electric charge, which is accumulated in the second driving electrode side capacitor 220, is expressed as −Q1. In this way, the electric charge (−Q1), which has the same polarity as that of the oscillator 30, is accumulated in the second driving electrode 41.

In the above circuit, while the predetermined electric charge is accumulated in the oscillator 30, the electric charges, which have the opposite polarities, respectively, can be alternately and periodically accumulated in the first driving electrode 40 and the second driving electrode 41.

Specifically, the electric charges, which have the opposite polarities, are alternately applied to the driving electrodes 40, 41 in the following manner. That is, in one state where the electric charge, which has the same polarity as that of the oscillator 30, is accumulated in the first driving electrode 40, the electric charge, which has the polarity opposite from that of the oscillator 30, is accumulated in the second driving electrode 41. Furthermore, in the other state where the electric charge, which has the polarity opposite from that of the oscillator 30, is accumulated in the first driving electrode 40, the electric charge, which is the same as that of the oscillator 30, is accumulated in the second driving electrode 41.

Thus, at the time of drive oscillation of the oscillator 30, an attractive force is exerted between one of the first and second driving electrodes 40, 41 and the corresponding tooth arrangement 30a of the oscillator 30, and a repulsive force is exerted between the other one of the first and second driving electrodes 40, 41 and the corresponding tooth arrangement 30a of the oscillator 30, and vice versa.

When the electric charges are alternately applied from the AC power source 100 to the driving electrodes 40, 41, the oscillator 30 is driven to make the drive oscillation at the frequency of the alternating electric current in the x-direction by the above-described attractive force and the repulsive force.

In the above operational stage where the oscillator 30 is driven to generate the drive oscillation, when the angular velocity Ω is applied around the z-axis, the Coriolis force is generated in the oscillator 30 in the y-direction. Thus, the sensing mass 32 of the oscillator 30 is oscillated in the y-direction by the Coriolis force to produce the measurement oscillation.

The capacitance between each sensing electrode 50 and the sensing mass 32 changes due to the measurement oscillation. The change in the capacitance is measured through the corresponding C/V converter 130 to determine the degree of the angular velocity Ω.

According to the present embodiment, there is provided the angular velocity sensor S1, which serves as the electrostatically oscillated device and which includes the base 20, the oscillator 30 and the first and second driving electrodes 40, 41. The oscillator 30 is arranged to be movable relative to the base 20 and is oscillatable in the predetermined direction, i.e., in the x-direction. The first and second driving electrodes 40, 41 are provided to apply the electrostatic forces to the oscillator 30, which is secured to the base 20, to generate the drive oscillation of the oscillator 30 in the x-direction. The first driving electrode 40 is provided on one side of the oscillator 30, and the second driving electrode 41 is provided on the other side of the oscillator 30. The angular velocity sensor S1 provides the following advantages.

That is, there is provided the angular velocity sensor S1, in which the electric charges, which have the opposite polarities, respectively, are alternately and periodically accumulated in the first driving electrode 40 and the second driving electrode 41 in the following manner. That is, while the predetermined electric charge is accumulated in the oscillator 30 at the time of generating the drive oscillation of the oscillator 30, the attractive force is exerted between one of the first and second driving electrodes 40, 41 and the oscillator 30, and the repulsive force is exerted between the other one of the first and second driving electrodes 40, 41 and the oscillator 30, and vice versa.

As discussed above, the electric charges, which have the opposite polarities, respectively, are alternately accumulated in the first and second driving electrodes 40, 41 while the predetermined electric charge is accumulated in the oscillator 30. Thus, throughout the time of generating the drive oscillation of the oscillator 30, the attractive force is exerted between one of the first and second driving electrodes 40, 41 and the oscillator 30, and the repulsive force is exerted between the other one of the first and second driving electrodes 40, 41 and the oscillator 30, and vice versa.

Therefore, according to the present embodiment, the drive force for generating the drive oscillation of the oscillator 30 is the sum of attractive force, which is exerted between one of the driving electrodes 40, 41 and the oscillator 30, and the repulsive force, which is exerted between the other one of the driving electrodes 40, 41 and the oscillator 30.

That is, in the previously proposed sensor, the difference between the electrostatic attractive force of one of the driving electrodes and the electrostatic attractive force of the other one of the driving electrodes is used as the drive force for oscillating the oscillator. In contrast, according to the present embodiment, the drive force is at least two times greater than that of the previously proposed sensor.

As discussed above, in the present embodiment, although the structures of the electrodes are the same as those of the previously proposed sensor, the voltage is not simply applied to the electrodes. Instead, in the present embodiment, while predetermined electric charge is accumulated in the oscillator 30, the electric charge, which has the polarity opposite from that of the oscillator 30, is applied to one of the driving electrodes 40, 41, and the electric charge, which has the same polarity as that of the oscillator 30, is applied to the other one of the driving electrodes 40, 41, and vice versa. In this way, the electrostatic attractive force and the electrostatic repulsive force are utilized to apply the electrostatic forces to the oscillator 30.

Thus, according to the present embodiment, in the angular velocity sensor S1, which serves as the electrostatically oscillated device and has the driving electrodes 40, 41 on the opposed sides of the oscillator 30, which are opposed in the direction of the drive oscillation of the oscillator 30, i.e., in the x-direction, the amplitude of the oscillation of the oscillator 30 is increased at the same power source voltage, which is the same as that of the previously proposed sensor.

Also, in the present embodiment, the oscillator side capacitor 200, which is used to accumulate the electric charge in the oscillator 30, is electrically connected to the oscillator 30. Furthermore, the first driving electrode side capacitor 210, which is used to accumulate the electric charge in the first driving electrode 40, is electrically connected to the first driving electrode 40. In addition, the second driving electrode side capacitor 220, which is used to accumulate the electric charge in the second driving electrode 41, is electrically connected to the second driving electrode 41.

With this construction, the accumulation of the electric charge in each corresponding component is appropriately accomplished in the present embodiment.

In the first embodiment, the present invention is implemented in the angular velocity sensor. However, the present invention can be applied to, for example, an electrostatically oscillated actuator.

Specifically, the present invention can be implemented in any electrostatically oscillated device, which includes the oscillator and the first and second driving electrodes. In this device, the oscillator is arranged to be movable relative to the base and is oscillatable in the predetermined direction. Furthermore, the first and second driving electrodes are provided to apply the electrostatic forces to the oscillator, which is secured to the base, to generate the drive oscillation of the oscillator in the predetermined direction. Here, the first driving electrode is provided on the one side of the oscillator, and the second driving electrode is provided on the other side of the oscillator.

Second Embodiment

Figure 6:
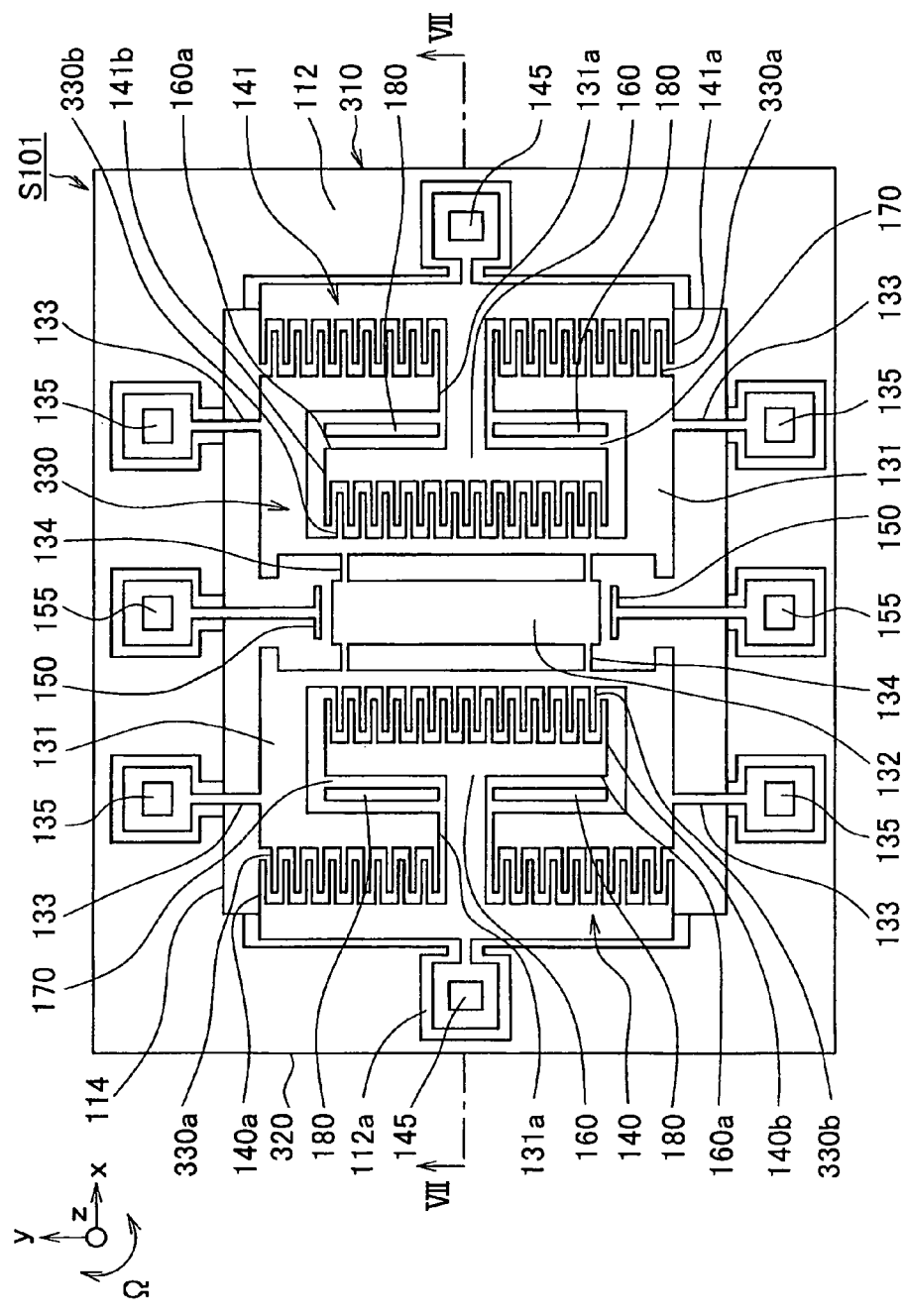
FIG. 6 is a schematic plan view of an angular velocity sensor according to a second embodiment of the present invention.
Figure 7:
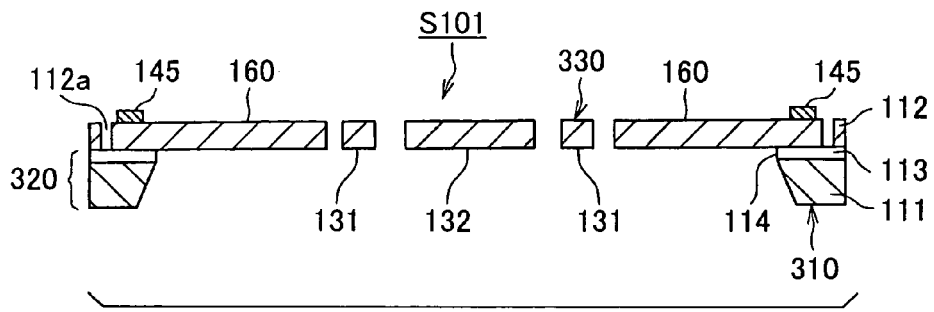
FIG. 7 is a cross sectional view taken along line VII-VII in FIG. 6.

A second embodiment of the present invention will be described with reference to the accompanying drawings. FIG. 6 is a schematic plan view of an electrostatically oscillated angular velocity sensor S101, which serves as an electrostatically oscillated device, according to the embodiment of the present invention. FIG. 7 is a cross sectional view taken along line VII-VII in FIG. 6.

With reference to FIG. 7, a board of the angular velocity sensor S101 is a silicon-on-insulator (SOI) board 310, which includes first and second silicon plates 111, 112 and an oxide film 113 interposed therebetween.

Trenches 112a are formed on the second silicon plate 112 to define an oscillator 330, driving electrodes 140, 141, sensing electrodes 150 and bridges 133, 134 in an etching process.

Furthermore, the first silicon plate 111 and the oxide film 113 are eliminated by etching in a portion of the SOI board 310, which corresponds to the oscillator 330, so that an opening 114 is formed. An outer peripheral portion of the first silicon plate 111 and of the oxide film 113 around the opening 114 is formed as a support arrangement, i.e., a base 320.

The oscillator 330 includes two frames 131 and a sensing mass 132. The frames 131 are arranged on the left and right sides, respectively, of the first silicon plate 112 in the x-direction. Each frame 131 is formed to have a frame shape in a plan view of the frame 131. The sensing mass 132 is arranged between the frames 131 and is formed to have a rectangular shape in a plan view of the sensing mass 132.

In the present embodiment, the oscillator 330 is connected to the base 320 through the four driving bridges 133. Also, in the present embodiment, the sensing mass 132 is connected to the frames 131 through the four sensing bridges 134.

Here, the driving bridges 133 are relatively freely deflectable in the x-direction and are limited from deflection in the y-direction in FIG. 6. Thus, the driving bridges 133 allow oscillation of the oscillator 330 in the x-direction. In contrast, the sensing bridges 134 are relatively freely deflectable in the y-direction and are limited from deflection in the x-direction. Thus, the sensing bridges 134 allow oscillation of the oscillator 330 in the y-direction.

Furthermore, in the second silicon plate 112, which is secured to the base 320, the driving electrodes 140, 141 are formed on the left and right sides of the frames 131 of the oscillator 330 to oppose each other in the x-direction.

The driving electrodes 140, 141 are provided to apply the electrostatic force to the oscillator 330 to generate the drive oscillation of the oscillator 330 in the x-direction. The driving electrode 140, which is located on the left side in FIG. 6 will hereinafter be referred to as a left driving electrode (or a first driving electrode) 140. Also, the driving electrode 141, which is located on the right side in FIG. 6, will be hereinafter referred to as a right driving electrode (or a second driving electrode) 141.

The left driving electrode 140 includes primary and secondary driving electrode portions 140a, 140b. The primary driving electrode portion 140a of the left driving electrode 140 is opposed to a left outer peripheral portion (a left outer tooth arrangement 330a having a plurality of teeth) of the oscillator 330, and the secondary driving electrode portion 140b of the left driving electrode 140 is opposed to an inner peripheral portion (a left inner tooth arrangement 330b having a plurality of teeth) of the left frame 131 of the oscillator 330. Similarly, the right driving electrode 141 includes primary and secondary driving electrode portions 141a, 141b. The primary driving electrode portion 141a of the right driving electrode 141 is opposed to a right outer peripheral portion (a right outer tooth arrangement 330a having a plurality of teeth) of the oscillator 330, and the secondary driving electrode portion 141b of the right driving electrode 141 is opposed to an inner peripheral portion (a right inner tooth arrangement 330b having a plurality of teeth) of the right frame 131 of the oscillator 330.

The secondary driving electrode portion 140b of the left driving electrode 140 is provided in a frame interior side securing portion 160 of the left driving electrode 140, which is a part of the second silicon plate 112 secured to the base 320 and which is arranged inside the left frame 131. Similarly, the secondary driving electrode portion 141b of the right driving electrode 141 is provided in a frame interior side securing portion 160 of the right driving electrode 141, which is a part of the second silicon plate 112 secured to the base 320 and which is arranged inside the right frame 131.

A portion of each frame 131 is cut through the frame 131 in the x-direction to form an opening 131a, and the frame interior side securing portion 160 is formed into a generally T-shaped body. The T-shaped body of the frame interior side securing portion 160 extends from a securing portion of the T-shaped body, which is secured to the base 320, and is received in the interior of the frame 131 through the opening 131a.

In the present embodiment, each of the primary and secondary driving electrode portions 140a, 140b, 141a, 141b is formed as a toothed driving electrode portion that has a plurality of teeth. The teeth of each of the primary and secondary driving electrode portions 140a, 140b, 141a, 141b and the teeth of a corresponding opposed one of the tooth arrangements 330a, 330b of the oscillator 330 are alternately arranged in the y-direction in FIG. 6.

Furthermore, the sensing electrodes 150 are arranged on the opposed sides of the sensing mass 132 of the second silicon plate 112, which are opposed to each other in the y-direction. The sensing electrodes 150 are provided to sense the oscillation (measurement oscillation) of the sensing mass 132 in the y-direction generated at the time of applying the angular velocity Ω around the z-axis, which is perpendicular to the x-direction and the y-direction, in the presence of the drive oscillation of the oscillator 330. Then, the sensing electrodes 150 output measurement signals, which correspond to the sensed oscillation (the measurement oscillation) of the sensing mass 132.

Here, pads (driving electrode side pads) 145, which are made of, for example, aluminum, are provided to the driving electrodes 140, 141. Also, pads (sensing electrode side pads) 155, which are made of, for example, aluminum, are provided to the sensing electrodes 150. Each of the pads 145, 155 are electrically connected to a circuit (not shown but similar to that of FIG. 5) through, for example, wire bonding.

Furthermore, at a securing portion of each driving bridge 133 to the base 320, a pad (oscillator side pad) 135 is formed, from, for example, aluminum. Each of the pads 135 is electrically connected to the circuit through, for example, wire bonding.

Furthermore, in the present embodiment, a dummy portion 180 is provided in each corresponding space, i.e., each back surface side space 170. The back surface side space 170 is defined between a back surface portion 160a of the corresponding frame interior side securing portion 160, which is opposite from the teeth of the secondary driving electrode portion 140b, 141b, and an opposed inner peripheral portion of the corresponding frame 131, which is opposed to the back surface portion 160a. The electric potential of each dummy portion 180 is in a floating state or is the same as the electric potential of the corresponding frame 131 (the oscillator 330). More specifically, in the present case, two dummy portions (first driving electrode side dummy portions) 180 are positioned inside the left frame (first frame) between the left side (first side) outer peripheral portion of the oscillator 330 and the secondary driving electrode portion 140b of the left driving electrode (the first driving electrode) 140 in FIG. 6. Also, two dummy portions (second driving electrode side dummy portions) 180 are positioned inside the right frame (second frame) between the right side (second side) outer peripheral portion of the oscillator 330 and the secondary driving electrode portion 141b of the right driving electrode (the second driving electrode) 141 in FIG. 6.

Each dummy portion 180 can be formed as a part of the second silicon plate 112. Alternatively, each dummy portion 180 can be formed as a separate component, such as a separate semiconductor, which is formed separately from the second silicon plate 112. However, it is desirable to secure each dummy portion 180 to the base 320. The method for securing each dummy portion 180 to the base 320 can be one, which is know to or which is obvious to a person skilled in the art.

For example, a dielectric member can be interposed between each dummy portion 180 and a portion of the second silicon plate 112, which is supported by the base 320 and is electrically separated from the oscillator 330 and each electrode 140, 141, 150, so that each dummy portion 180 is supported by the base 320 through the dielectric member.

Alternatively, each dummy portion 180 can be secured to an appropriate portion of the frame interior side securing portion 160 through a dielectric joining member. The pattern of the trenches 112a, which define each corresponding component shown in FIG. 6, should be understood as the exemplary pattern of the trenches 112a. For example, the pattern of the trenches 112a can be changed to make each dummy portion 180 supported by the base 320 only at one longitudinal end of the dummy portion 180 and thereby to make each dummy portion 180 cantilevered.

However, it should be noted that each dummy portion 180 can be made movable within a limited range without contacting the corresponding frame 131 of the oscillator 330 and the corresponding frame interior side securing portion 160.

When the electric potential of the dummy portion 180 needs to be made as the same as that of the corresponding frame 131, i.e., of the oscillator 330, an electrode, which is electrically connected to the dummy portion 180 may be provided to an appropriate location to apply the same voltage as that of the oscillator 330 to the dummy portion 180 through this electrode.

Next, the manufacturing method of the angular velocity sensor S101, which is made of the silicon-on-insulator (SOI), will be described. FIGS. 8A to 9D show the manufacturing method of the angular velocity sensor S101. Specifically, each of FIGS. 8A to 9D shows a cross section of a corresponding workpiece, which is similar to that of FIG. 7, in a corresponding manufacturing step.

Figure 8A:
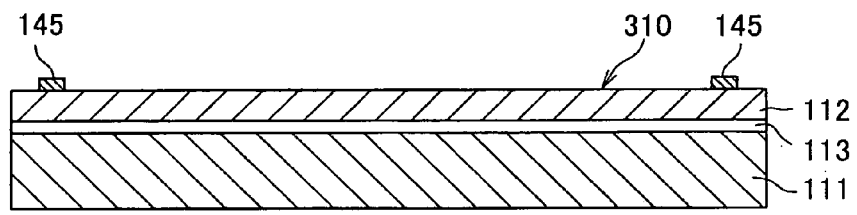
FIGS. 8A to 8C are diagrams, which respectively indicate cross sections similar to that of FIG. 7 and show manufacturing steps of the angular velocity sensors of the second embodiment.

First, as shown in FIG. 8A, the SOI board 310 is prepared. The SOI board 310 includes the first and second silicon plates 111, 112 and the oxide film 113. The first and second silicon plates 111, 112 are made of single crystal silicon. The oxide film 113 has a thickness of, for example, 1 μm and is interposed between the first silicon plate 111 and the second silicon plate 112.

Then, phosphorus or the like is diffused (N+ diffusion) into the entire surface of the second silicon plate 112 at a high density to reduce the contact resistance between the second silicon plate 112 and each corresponding aluminum pad 135, 145, 155 (only the pads 145 are depicted in the drawing).

Next, the respective pads 135, 145, 155 are formed by vapor depositing aluminum of, for example, 1 μm thickness, onto the surface (the second silicon plate 112) of the SOI board 310 and then by photo-etching the aluminum.

Figure 8B:
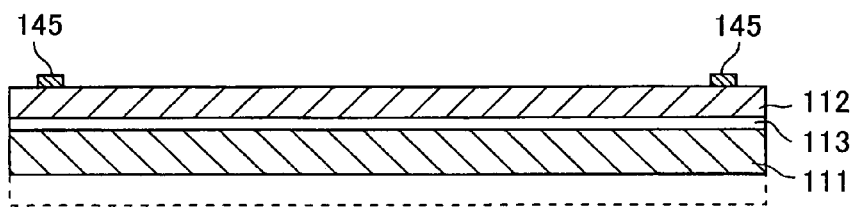

Next, as shown in FIG. 8B, the back surface (the first silicon plate 111) of the SOI board 310 is ground and is polished through back polishing to a predetermined thickness (e.g., 300 μm), so that the back surface (the first silicon plate 111) of the SOI board 310 is mirror finished.

Figure 8C:
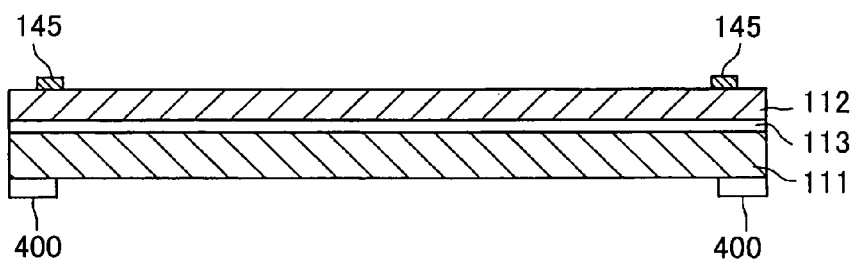

Next, as shown in FIG. 8C, a plasma SiN film 400 of, for example, 0.5 μm, is deposited onto the back surface (the first silicon plate 111) of the SOI board 310 to form a photo pattern. Then, the plasma SiN film 400 is etched to form an opening in a predetermined area of the plasma SiN film 400.

Figure 9A:
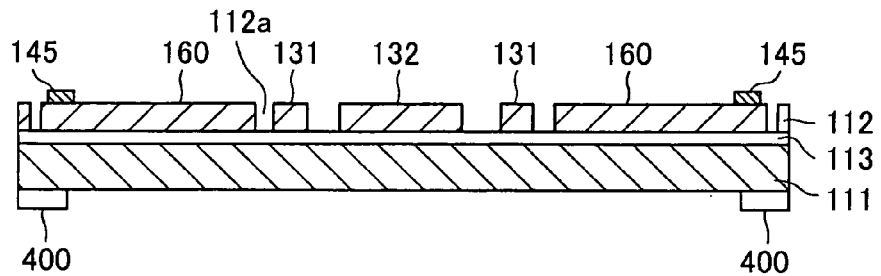
FIGS. 9A to 9D are diagrams, which are similar to FIGS. 8A to 8C and show manufacturing steps that follow the manufacturing steps of FIGS. 8A to 8C.

Next, with reference to FIG. 9A, a pattern, which defines the oscillator 330, the driving electrodes 140, 141, the sensing electrodes 150, the bridges 133, 134 and the dummy portions 180 of the back surface side spaces 170, is formed on the surface of the second silicon plate 112. Then, the trenches 112a, which reach the oxide film 113, are formed vertically by dry etching.

Figure 9B:
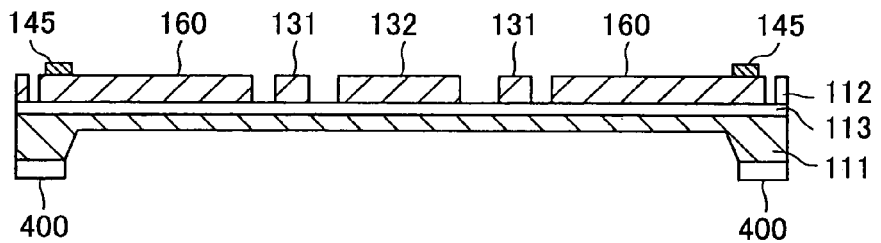

Then, as shown in FIG. 9B, the first silicon plate 111 is deeply etched in KOH solution while the pattern formed in the plasma SiN film 400 is used as a mask.

At this time, when the etching proceeds to the oxide film 113, the oxide film 113 is destroyed by the fluid pressure of the etching solution. Thus, the etching time should be carefully controlled to end in a manner that leave the silicon of 10 µm in the first silicon plate 111 to limit the destruction of the oxide film 113.

Figure 9C:
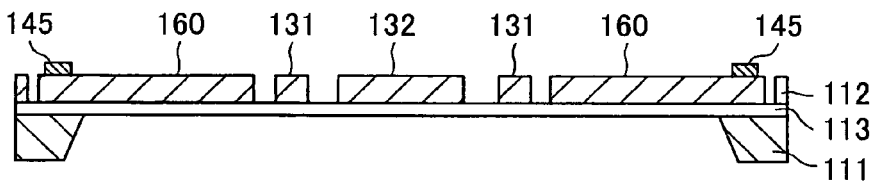

Next, as shown in FIG. 9C, Si, which is left in the step of FIG. 9B, is removed by plasma dry etching. At this time, the plasma SiN film 400, which is present on the back surface of the SOI board 310, is simultaneously removed.

Figure 9D:
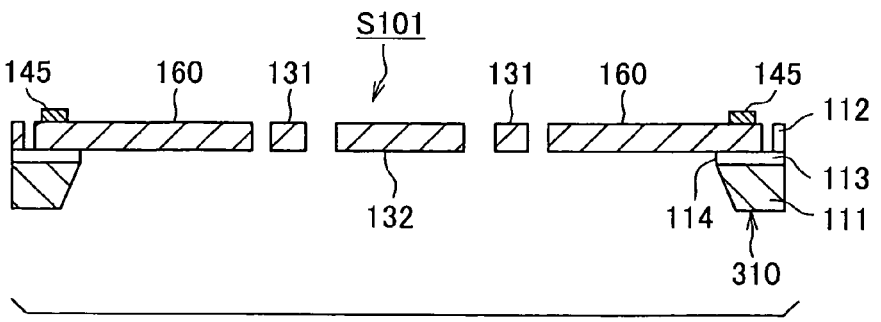
Figure 10:
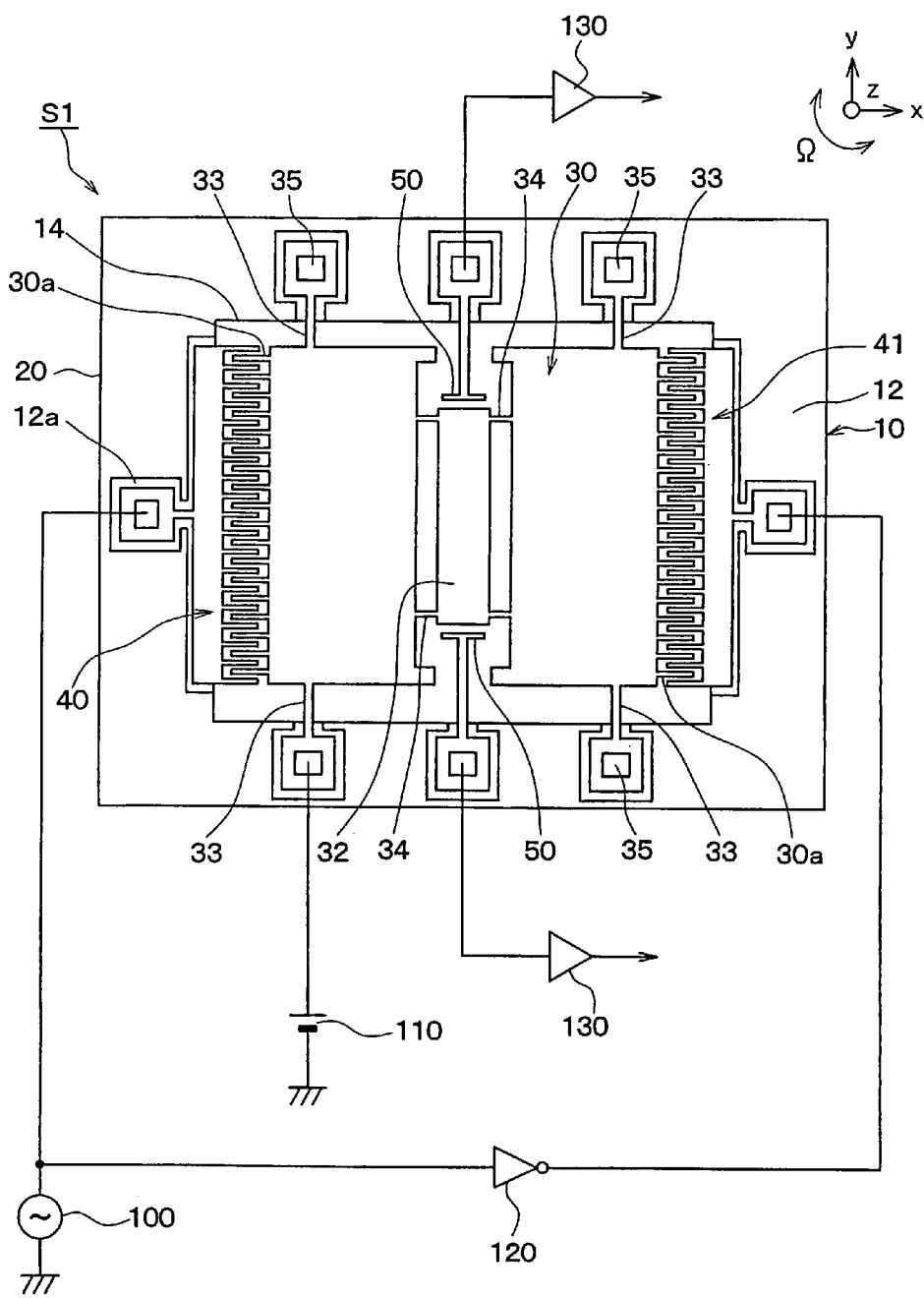
FIG. 10 is a schematic plan view of a previously proposed electrostatically oscillated angular velocity sensor, which serves as an electrostatically oscillated device.
Figure 11:
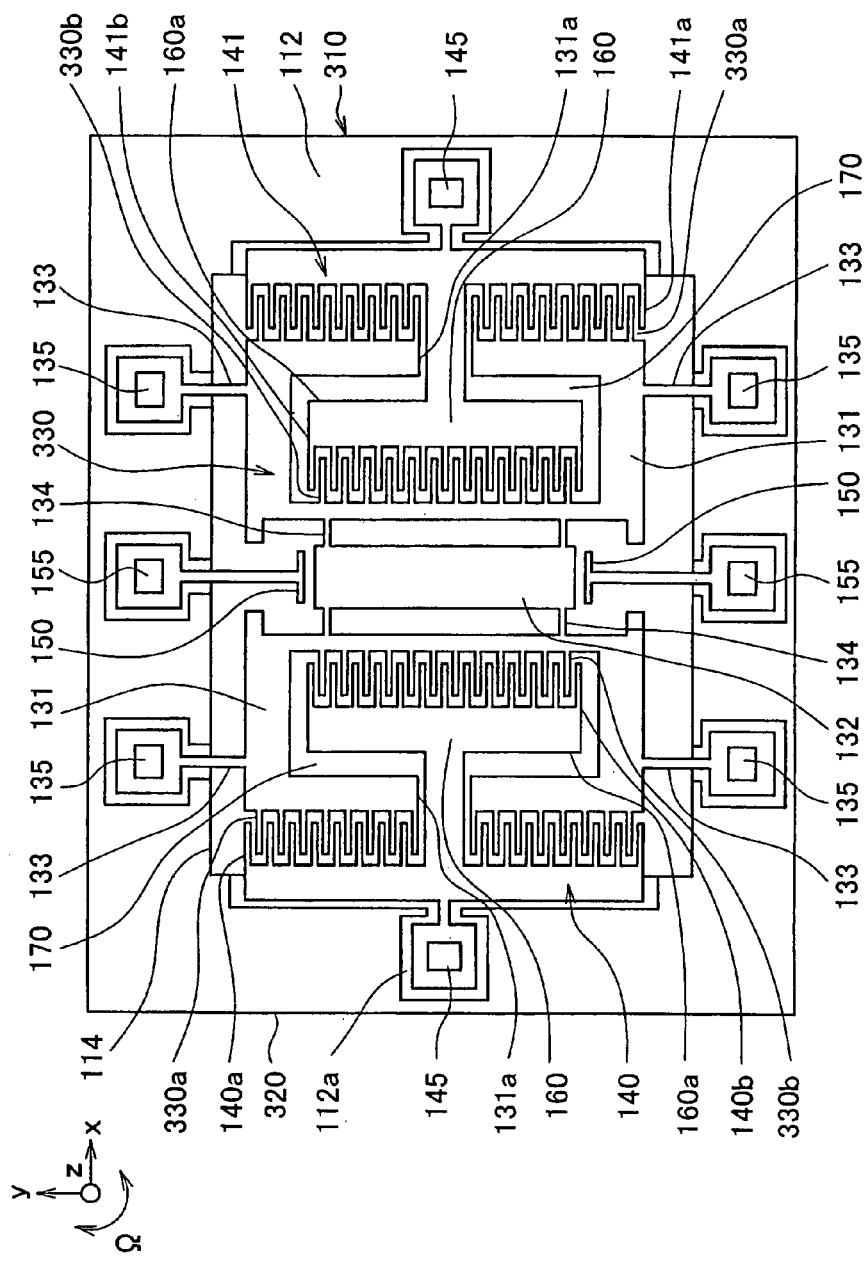
FIG. 11 is a schematic plan view of another previously proposed prototype angular velocity sensor.

Finally, as shown in FIG. 9D, the oxide film 113 is removed by dry etching, so that the oscillator 330 is formed. Each dummy portion 180 needs to be secured to the base 320 before the removal of the oxidation film 113. In this way, the manufacturing of the angular velocity sensor S101 is completed. Thereafter, each of the pads 135, 145, 155 is electrically connected to the above circuit by, for example, wire bonding.

Next, operation of the angular velocity sensor S101 will be described. The predetermined voltage is applied from the above circuit to the oscillator 330 through the oscillator side pad 135 in a manner similar to the one discussed in the first embodiment with reference to FIG. 5. Also, the two alternating voltages (drive signals), which are of opposite phases, are applied to the left and right driving electrodes 140, 141, respectively, of FIG. 6 in a manner similar to the one discussed in the first embodiment with reference to FIG. 5.

In this way, the electrostatic force (electrostatic attractive force) is generated between each corresponding tooth arrangement 330a, 330b of the oscillator 330 and the opposed driving electrode 140, 141, so that the entire oscillator 330 is driven through the driving bridges 133 to make the drive oscillation in the x-direction.

In the above state where the oscillator 330 is driven to generate the drive oscillation, when the angular velocity Ω is applied around the z-axis, the Coriolis force is generated in the oscillator 330 in the y-direction. Thus, the sensing mass 132 of the oscillator 330 is oscillated in the y-direction by the Coriolis force to produce the measurement oscillation.

Due to the measurement oscillation, the capacitance between each sensing electrode 150 and the sensing mass 132 changes. Through measurement of a change in the capacitance between each sensing electrode 150 and the sensing mass 132, the angular velocity Ω can be determined.

According to the present embodiment, there is provided the angular velocity sensor S101, which serves as the electrostatically oscillated device and which includes the base 320, the oscillator 330 and the driving electrodes 140, 141. The oscillator 330 is arranged to be movable relative to the base 320 and is oscillatable in the predetermined direction, i.e., in the x-direction. The driving electrodes 140, 141 are provided to apply the electrostatic force to the oscillator 330, which is secured to the base 320, to generate the drive oscillation of the oscillator 330 in the x-direction. The angular velocity sensor S101 provides the following advantages.

The oscillator 330 has the frames 131, each of which has the frame shape in the plan view of the frame 131. Each frame interior side securing portion 160 is placed inside the corresponding frame 131 and is secured to the base 320.

Each driving electrode 140, 141 has the toothed primary driving electrode portion 140a, 141a and the toothed secondary driving electrode portion 140b, 141b. The primary driving electrode portion 140a, 141a is opposed to the corresponding outer side of the oscillator 330 in the x-direction, and the secondary driving electrode portion 140b, 141b is provided to the corresponding frame interior side securing portion 160 and is opposed to the inner peripheral side of the corresponding frame 131 in the x-direction.

Furthermore, the dummy portion 180 is provided in each corresponding space, which is defined between the back surface portion 160a of the corresponding frame interior side securing portion 160, which is opposite from the teeth of the secondary driving electrode portion 140b, 141b, and an opposed inner peripheral portion of the corresponding frame 131, which is opposed to the back surface portion 160a in the x-direction. The electric potential of each dummy portion 180 is in the floating state or is the same as the electric potential of the frame 131.

In the angular velocity sensor S101 of the present embodiment, the oscillator 330 has the frames 131, in each of which the secondary driving electrode portion 140b, 141b is provided. Thus, while an increase in the size of the angular velocity sensor S101 is limited, the effective surface area of each driving electrode, which aids in the drive oscillation of the oscillator 330, is increased.

The dummy portions 180 are provided in the back surface side spaces 170 and have the electric potential, which is in the floating state or is the same as that of the frames 131. Thus, the electrostatic force in each back surface side space 170 is reduced by the corresponding dummy portion 180.

That is, the back surface portion 160a of each frame interior side securing portion 160, which is opposite from the teeth of the secondary driving electrode portion 140b, 141b of the frame interior side securing portion 160, does not directly face the opposed inner peripheral portion of the frame 131 due to the positioning of the dummy portions 180 therebetween. Thus, the electrostatic force, which is applied from the back surface 160a and interferes with the drive oscillation, has the less effect on the frame 131.

Therefore, according to the present embodiment, in the angular velocity sensor, which serves as the electrostatically oscillated device and is fabricated by etching the board to have the base 320, the oscillator 330 and the driving electrodes 140, 141, the drive force can be appropriately increased without substantially increasing the size of the angular velocity sensor.

In the present embodiment, it is desirable that the electric potential of each dummy portion 180 is in the same state as that of the oscillator 330. Since the electrostatic force is not exerted between each dummy portion 180 and the frame 131, the application of the undesirable electrostatic force to the oscillator 330 in the direction, which is opposite from the effective electrostatic force for generating the drive oscillation of the oscillator 330, can be appropriately limited.

The second embodiment can be modified as follows.

In the above angular velocity sensor, the oscillator 330 and the other corresponding components are formed by the back surface processing. Alternatively, the oscillator 330 and other corresponding components can be formed by the front surface processing, in which sacrificial etching of the oxide film 113 of the SOI board 310 may be performed, or the trench etching and the side etching may be performed from the front surface side of the SOI board 310 to form the oscillator 330 and the corresponding components. In this case, each dummy portion 180 is supported by the base 320 by performing the etching in a manner that leaves the underneath oxide film 113, which is positioned underneath the dummy portion 180.

Each dummy portion 180 can be supported by a separate corresponding structure, which is located below the SOI board 110 of the angular velocity sensor S101 or below the second silicon plate 112 and supports the dummy portion 180. Alternatively, each dummy portion 180 can be mechanically secured to and electrically insulated from the adjacent driving electrode 140, 141 or the oscillator 330. In such a case, the corresponding electrical potential can be applied to each dummy portion 180 through a separate wiring, which is separated from the adjacent driving electrode 140, 141 and the oscillator 330.

In the above embodiment, the present invention is implemented in the angular velocity sensor. However, the present invention can be implemented in, for example, an electrostatically oscillated actuator.

Specifically, the present invention can be implemented in the electrostatically oscillated device, which has the base, the oscillator and the driving electrodes, each of which has the driving electrode portion received in the corresponding frame of the oscillator.

Additional advantages and modifications will readily occur to those skilled in the art. The invention in its broader terms is therefore not limited to the specific details, representative apparatus, and illustrative examples shown and described.

What is claimed is:

1. An electrostatically oscillated device comprising:
   a base;
   an oscillator that is movable relative to the base, wherein the oscillator is oscillatable in a predetermined direction and includes first and second frames, which are arranged one after another in the predetermined direction;
   first and second driving electrodes that are secured to the base and apply an electrostatic force to the oscillator to make drive oscillation of the oscillator in the predetermined direction, wherein:
   the first and second driving electrodes are arranged on first and second sides, respectively, of the oscillator, which are opposed to each other in the predetermined direction;
   the first driving electrode includes:
      a primary driving electrode portion that is opposed to a first side outer peripheral portion of the oscillator in the predetermined direction;
      a frame interior side securing portion that is secured to the base and extends from the primary driving electrode portion of the first driving electrode into the first frame; and
      a secondary driving electrode portion that is provided to the frame interior side securing portion of the first driving electrode to oppose an inner peripheral portion of the first frame in the predetermined direction;
   the second driving electrode includes:
      a primary driving electrode portion that is opposed to a second side outer peripheral portion of the oscillator in the predetermined direction;
      a frame interior side securing portion that is secured to the base and extends from the primary driving electrode portion of the second driving electrode into the second frame; and
      a secondary driving electrode portion that is provided to the frame interior side securing portion of the second driving electrode to oppose an inner peripheral portion of the second frame in the predetermined direction;
   at least one first driving electrode side dummy portion that is positional inside the first frame between the first side outer peripheral portion of the oscillator and the secondary driving electrode portion of the first driving electrode in the predetermined direction and has an electric potential that is in a floating state or is the same as that of the first frame; and
   at least one second driving electrode side dummy portion that is positional inside the second frame between the second side outer peripheral portion of the oscillator and the secondary driving electrode portion of the second driving electrode in the predetermined direction and has an electric potential that is in a floating state or is the same as that of the second frame.

2. The electrostatically oscillated device according to claim 1, wherein:
   the electric potential of the at least one first driving electrode side dummy portion is the same as that of the first frame;
   the electric potential of the at least one second driving electrode side dummy portion is the same as that of the second frame; and
   the electric potential of the first frame is the same as the electric potential of the second frame.

3. The electrostatically oscillated device according to claim 1, wherein:
   the first frame has an opening, through which the frame interior side securing portion of the first driving electrode extends into an interior of the first frame; and
   the second frame has an opening, through which the frame interior side securing portion of the second driving electrode extends into an interior of the second frame.

* * * * *